United States Patent
Liauw et al.

(10) Patent No.: US 6,618,781 B1
(45) Date of Patent: Sep. 9, 2003

(54) COMPUTER ADD-ON CARD CAPABLE OF OUTPUTTING DIFFERENT TYPE OF DIGITAL TV SIGNALS

(75) Inventors: Siang Siung Liauw, Taipei (TW); Shin-Yun Lin, Taipei (TW)

(73) Assignee: Tatung Co., Ltd., Taipei (TW)

( * ) Notice: Subject to any disclaimer, the term of this patent is extended or adjusted under 35 U.S.C. 154(b) by 0 days.

(21) Appl. No.: 09/666,289

(22) Filed: Sep. 21, 2000

(51) Int. Cl.[7] .................. H05K 7/10; G06F 13/00; G06F 13/12; H04N 7/01; H04L 12/66; G09G 5/02

(52) U.S. Cl. .................. 710/301; 710/303; 710/62; 710/72; 348/441; 370/463; 345/603

(58) Field of Search .................. 710/300–302, 710/305–306, 313–315, 62–74; 348/441–459, 469–496, 181, 192; 345/603, 501–520; 370/463

(56) References Cited

U.S. PATENT DOCUMENTS

| | | | | |
|---|---|---|---|---|
| 5,299,193 A | * | 3/1994 | Szczepanek | 370/463 |
| 5,606,348 A | * | 2/1997 | Chiu | 345/213 |
| 5,611,057 A | * | 3/1997 | Pecone et al. | 710/301 |
| 5,784,573 A | * | 7/1998 | Szczepanek et al. | 709/250 |
| 5,867,669 A | * | 2/1999 | Breen et al. | 709/250 |
| 5,892,522 A | * | 4/1999 | Moutin | 345/540 |
| 6,097,437 A | * | 8/2000 | Hwang | 348/441 |
| 6,122,010 A | * | 9/2000 | Emelko | 348/461 |
| 6,226,040 B1 | * | 5/2001 | Kuo et al. | 348/446 |

* cited by examiner

Primary Examiner—Glenn A. Auve
Assistant Examiner—Trishu Vu
(74) Attorney, Agent, or Firm—Bacon & Thomas, PLLC

(57) ABSTRACT

This invention is about a computer add-on card that is capable of transferring MPEG-2 Transport Stream file from a computer storage (hard disk, DVD-ROM, etc.) to an external equipment such as: Digital TV settop box, modulator, etc. Besides handling PCI protocol communication, this add-on card also controls MPEG-2 Transport Stream generation, and signal format and interface conversion. To incorporate various output signal formats and interfaces, a daughter board is implemented as the output signal format and interface converter part. Using this daughter board, user can have various different Digital TV output signals without the need of modifying the application program.

7 Claims, 7 Drawing Sheets

COMPUTER ADD-ON CARD CAPABLE OF OUTPUTTING DIFFERENT TYPE OF DIGITAL TV SIGNALS

BACKGROUND OF THE INVENTION

1. Field of the Invention

The presented invention relates to computer add-on cards, particularly to a computer add-on card that is capable of outputting various different type of digital TV signals depending on user configuration.

2. Description of Related Art

Digital TV has recently become the focus of the next generation entertainment and information service in the broadcast environment. Many institutions and standard bodies have published different Digital TV standards with different signal formats (PECL, LVDS, RS-422, etc.) and interfaces (204-Byte parallel mode, serial, etc.) based on Motion Picture Experts Group-2 (MPEG-2) standard. Each Digital TV standard has its own application and market segment.

To cope with this situation, a testing tool—such as MPEG-2 Transport Stream generator—with various signal format and interface support is an important key to the digital TV related products development. Conventionally, this kind of testing tool is very expensive and only provides some limited number of output formats. If user needs another output signal format and interface, he has to spend more money to purchase a signal converter or even a new module from the original manufacturer. In the worst case user will have to purchase it from another testing tools manufacturer if the original manufacturer does not support this signal format. Again because these testing tools are not compatible one another, user must purchase a whole new testing tool set from the other manufacturer and abandon the old one that has exactly the same functions except the different output signal and interface. From the user's view point, it is quite a waste of resources. The more Digital TV standards they adopt in your products, the more waste they make to purchase these testing tools. Therefore, to improve this condition users need a low cost and easy to implement testing tool that is capable of outputting different signal formats and interfaces.

SUMMARY OF THE INVENTION

The main purpose of the presented invention is to provide a low cost PCI based add-on card that is capable of transmitting various Digital TV signal formats depending on user's requirement. This add-on card comprises the following components:

- An interface daughter board for converting the output signal format.
- A Peripheral Component Interconnect (PCI) bus interface that connects to computer's PCI slot.
- A PCI Bridge to handle communication between computer host and this add-on card.
- A Field Programmable Gate Array (FPGA) unit that provides control signal conversion.
- A bit rate generator that produces all the clock signals needed by the system.
- Two First In First Out (FIFO) buffers that function as temporary data storage.
- An output connector where various DTV signal formats are output from.

Using this flexible design architecture, it is very easy to integrate any Digital TV signal formats and interfaces to this testing tool. To have different output interface, all the user needs to do is replacing the daughter board on this add-on card with the new different one and setting the appropriate control jumper position. The user does not need to change anything else, including the application program, and everything will work properly.

The other purposes, advantages, and features of this invention will become more apparent from the following detailed description and the accompanying drawings.

DETAILED DESCRIPTION OF THE PREFERRED EMBODIMENT

Figure 1:
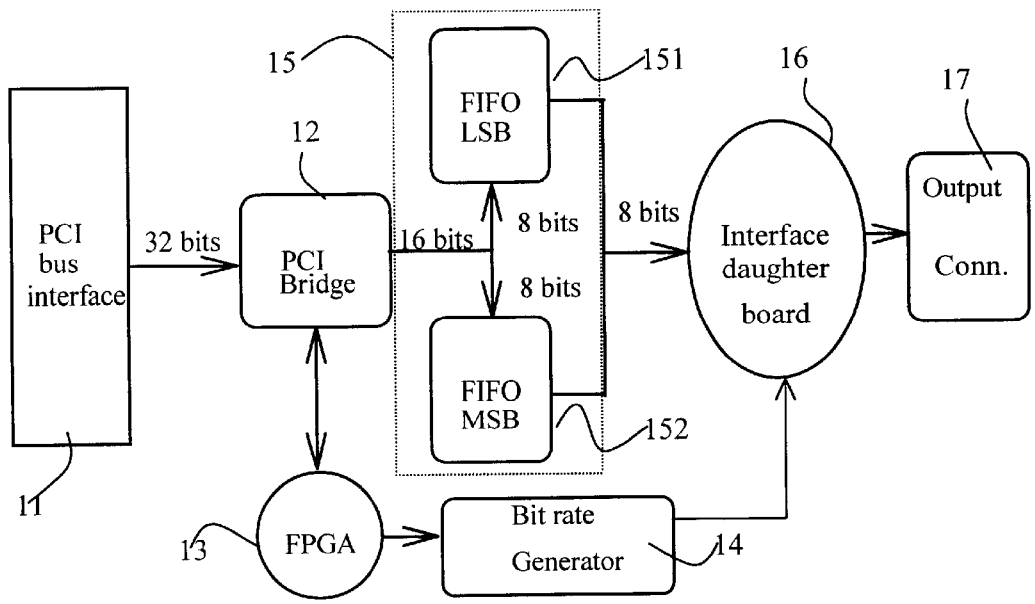
FIG. 1 shows the system block diagram of this invention.

FIG. 1 shows a system block diagram of a computer add-on card that is capable of outputting various different type of Digital TV signals in accordance with this invention. The add-on card comprises a PCI bus interface 11, a PCI bridge 12, a FPGA unit 13, a bit rate generator 14, a set of FIFO buffers 15, an interface daughter board 16, and an output connector 17. Besides handling PCI protocol communication, this add-on card also controls MPEG-2 Transport Stream generation, and signal format and interface conversion.

The connection between this add-on card and computer is made through PCI bus interface 11. All PCI protocol communication is handled by PCI bridge 12. The data received from computer through PCI bus are then sent to FIFO buffers 15. These FIFO buffers 15 consist of a Least Significant Bit (LSB) buffer 151 and a Most Significant Bit (MSB) buffer 152 used as temporary LSB and MSB data storage respectively before these data are further sent to interface daughter board 16 for signal format and interface conversion. The FPGA unit 13 is responsible for providing control signals conversion. To provide all clock signals needed by the system, a bit rate generator 14 is used.

Figure 2:
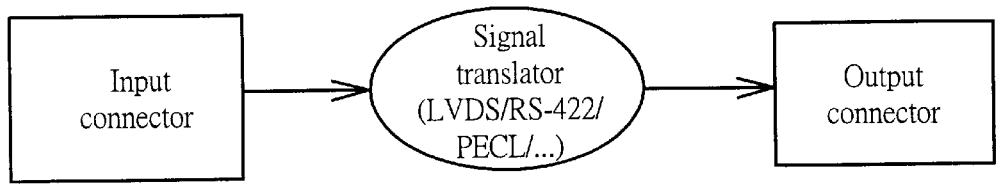
FIG. 2 shows the block diagram of the interface daughter board of this invention.

The interface daughter board 16 functions as interface and signal format converter for the add-on card. The signals input coming from the add-on card to the interface daughter board will be translated into its corresponding signals by the signal translator module before being sent back to the add-on card. Changing the definition of the output connector of the interface daughter board will change the interface definition of the add-on card's output. This invention enables user to incorporate different output signal formats and interfaces to the add-on card by replacing the interface daughter board. FIG. 2 shows the block diagram of the interface daughter board.

Figure 3:
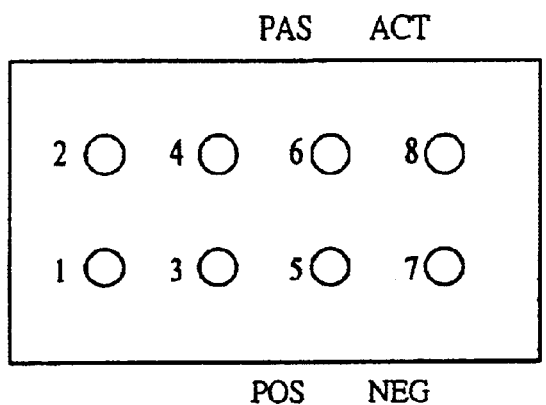
FIG. 3 shows the control jumper of this invention.

To facilitate the interface daughter board hardware configuration, an 8-pin control jumper located on the add-on card is, as shown in FIG. 3, is used. The configuration of this control jumper is as follows:

1-2 is fitted: parallel output data format is enabled.

1-2 is not fitted: serial output data format is enabled.

6-8 is fitted: output SYNC signal is enabled.

4-6 is fitted: output SYNC signal is always low.

Figure 4:
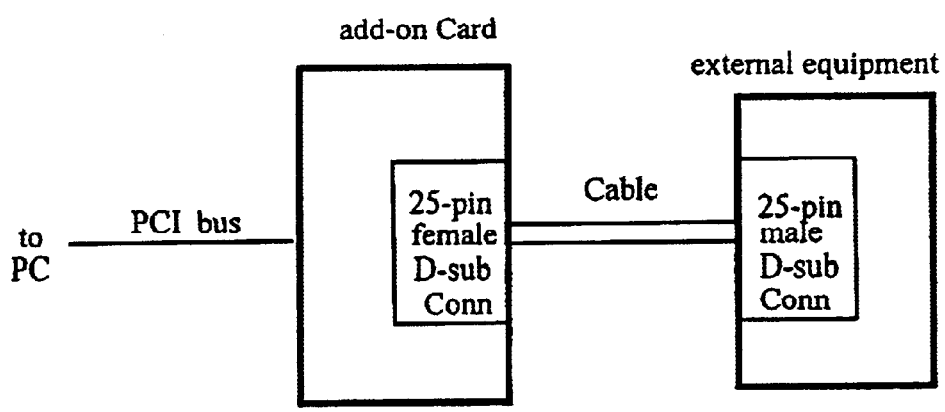
FIG. 4 shows the connection between this invention and an external equipment for DVB LVDS interface.

3-5 is fitted: output positive edge triggered CLK signal 5-7 is fitted: output negative edge triggered CLK signal FIG. 4 shows the connection between the add-on card and an external equipment for Digital Video Broadcasting Low Voltage Differential Signaling (DVB LVDS) interface. In this case the connection should be made by using a 100 Ohm, 24 Gauge, 12 twisted pairs with overall shield cable. The maximum cable length is 30 feet. For the other Digital TV signal interfaces, suitable cable will be needed for the connection.

Figure 5:
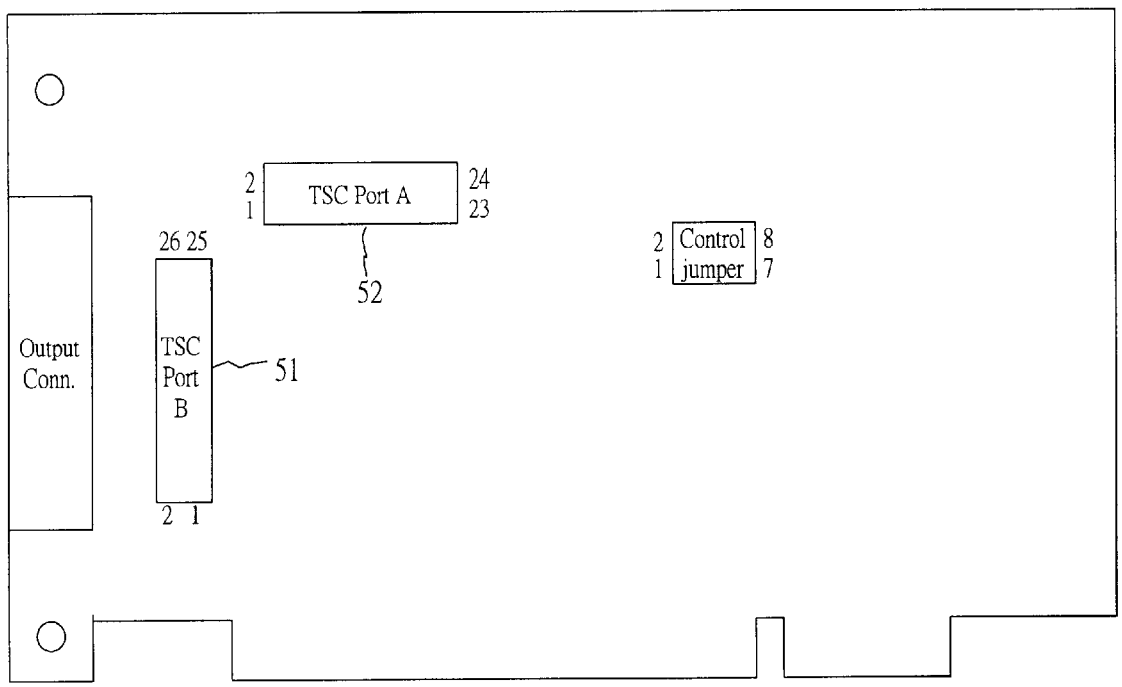
FIG. 5 shows the location of various connectors and control jumper of the add-on card of this invention.
Figure 6:
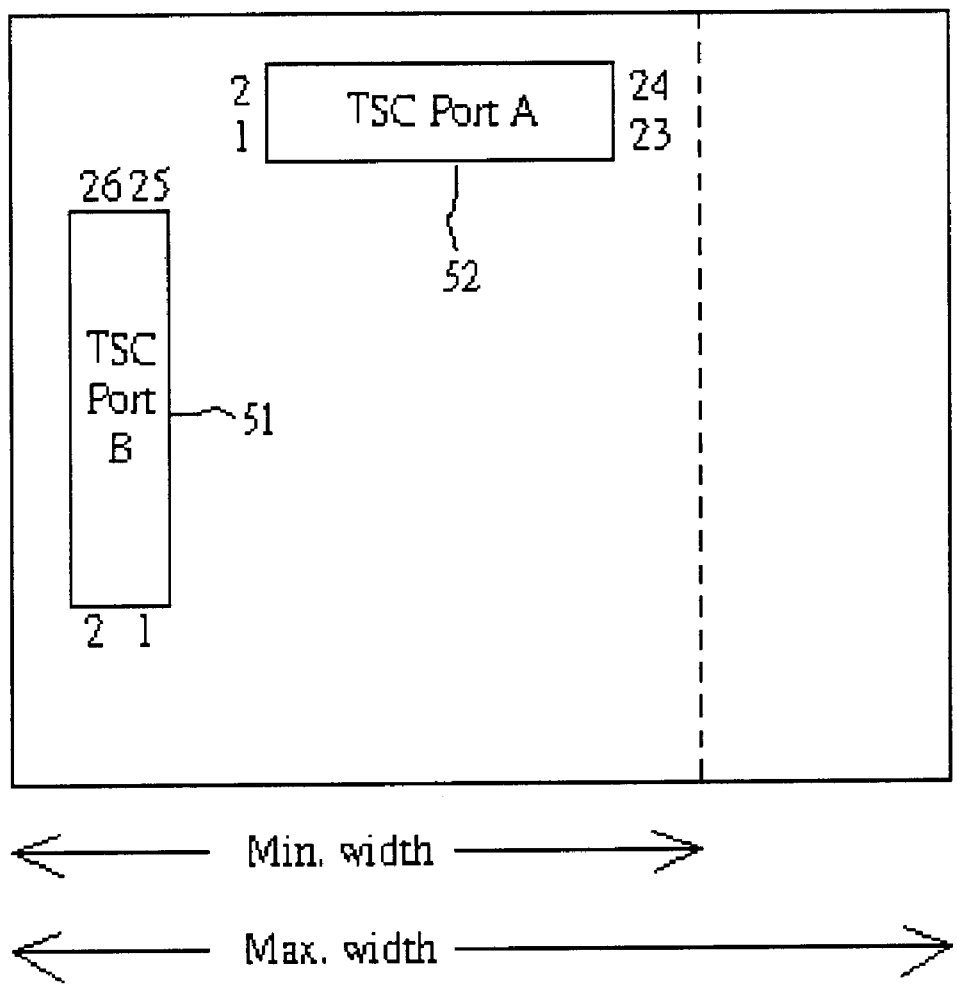
FIG. 6 shows the interface daughter board of this invention.

The add-on card and the interface daughter board are shown in FIG. 5 and FIG. 6 respectively. The signals from the add-on card are sent to the interface daughter board through the first interface port (TSC Port A 52). On receiving these signals, interface daughter board 16 will do the necessary signal and interface conversion and send the converted signals back to the add-on card through the second interface port (TSC Port B 51). These signals are then output to the external equipment through the output connector 17 of the add-on card.

The first interface port and the second interface port should be designed to be different to prevent the user from misplacing the interface daughter board 16 to the add-on card that can causes permanent device damage. Some approach to this is to use two connectors with different pin number or two different type connectors for the first and second interface ports. For example, TSC Port A has 24 pins, while TSC Port B has 26 pins. Please refer to FIG. 5 and FIG. 6 for better understanding. The pin assignments of TSC Port A are as follows:

Pins 1, 3, and 5: 5 V power source.

Pins 2, 4, 6, 8, 10, 12, 14, and 16: DATA (0–7) signals.

Pins 7, 11, 15, 18, and 19: GND.

Pin 9: Data Valid (DVALID) signal.

Pin 13: Synchronization (SYNC) signal.

Pin 17: Clock (CLK) signal.

Pin 20: Serial Data signal.

Pin 21: Serial/Parallel control signal 0 (this signal is directly connected to the control jumper).

Pin 22: Serial/Parallel control signal 1 (this signal is directly connected to the control jumper).

Pins 23 and 24: 3.3 V power source.

Figure 7:
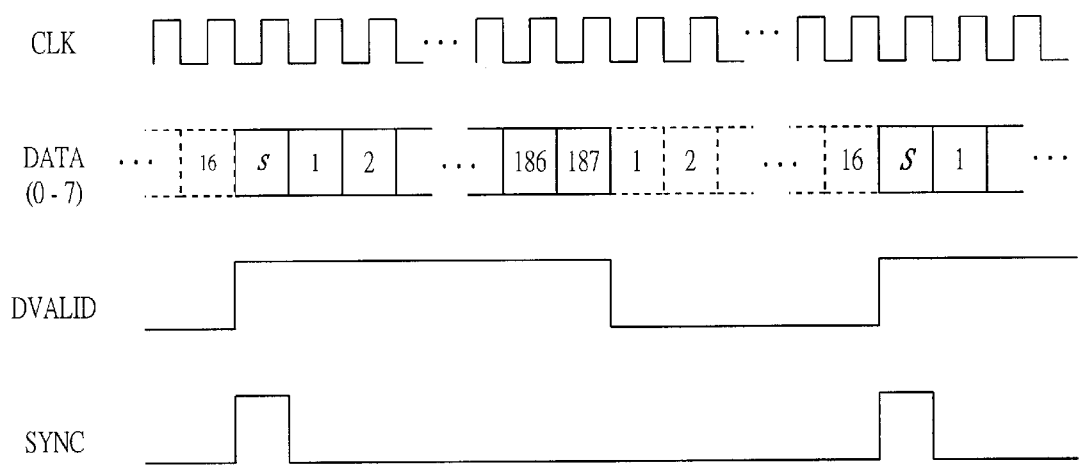
FIG. 7 shows 204-Byte parallel mode timing diagram of this invention.
Figure 8:
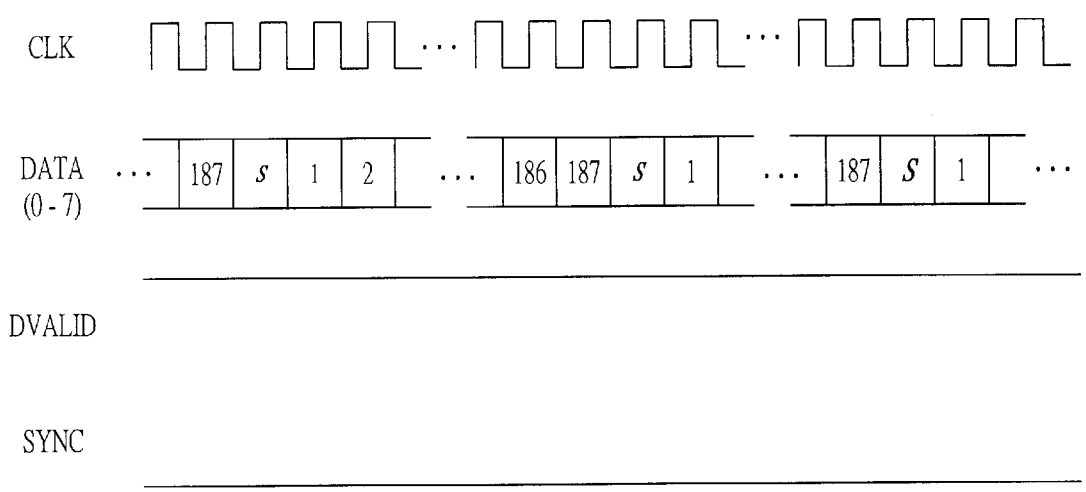
FIG. 8 shows 188-Byte parallel mode timing diagram of this invention.

In the description above, DATA (0–7) signals represent MPEG-2 Transport Stream packet data word (8-bit data: DATA 0 to DATA 7) with DATA 7 as the Most Significant Bit. As shown in FIG. 7 and FIG. 8, DATA (0–7) consist of 188 byte MPEG-2 Transport Stream packet in 188-Byte parallel mode. For 204-Byte parallel mode, these data also include 16 dummy bytes padded at the end of each MPEG-2 Transport Stream packet. To indicate the valid bytes in a MPEG-2 Transport Stream packet, DVALID signal is used. Active logic "1" of this signal indicates valid data at the interface.

Figure 9:
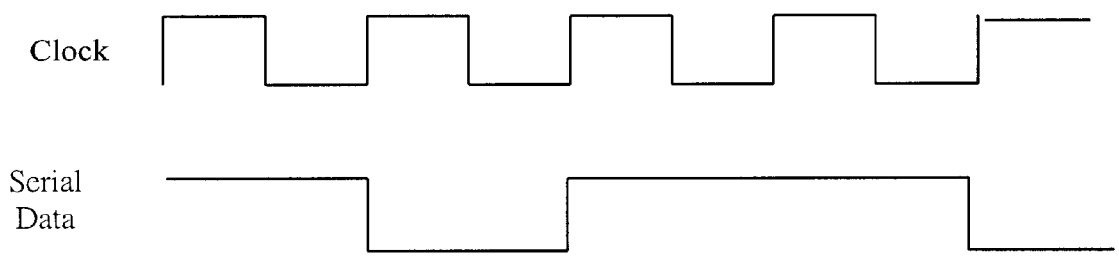
FIG. 9 shows serial mode timing diagram of this invention.

External equipment can use SYNC signal to synchronize the data received from this add-on card. Active logic "1" usually indicates the beginning of a MPEG-2 Transport Stream packet. Some external equipment does not require this signal in 188-Byte parallel mode. Please also refer to the timing diagram in FIG. 9 for signal relationship in serial mode of this invention.

The pin assignments of TSC Port B are as follows:

Pin 1 to pin 24: connected to pins 14, 1, 15, 2, 16, 3, 17, 4, 18, 5, 19, 6, 20, 7, 21, 8, 22, 9, 23, 10, 24, 11, 25, and 12 of the output connector respectively.

Pin 25: GND.

Pin 26: connected to pin 13 of the output connector.

The first interface port position forms an angle of 90 degrees with respect to the second interface port position. Besides preventing the user from misplacing the interface daughter board 16 to the add on card, this design also prevents the interface daughter board 16 from loosening.

In conclusion, this invention provides a low cost, flexible, and easy to implement testing tool for the development of Digital TV related products of any standards. Although the present invention has been explained in relation to its preferred embodiment, it is to be understood that many other possible modifications and variations can be made without departing from the spirit and scope of the invention as hereinafter claimed.

What is claimed is:

1. A computer add-on card that is capable of outputting various different types of Digital TV] signals, the add-on card comprising:

an interface daughter board for converting an output signal format;

a Peripheral Component Interconnect (PCI) bus interface that connects to a PC's PCI slot;

a PCI Bridge to handle communication between a computer host and the add-on card;

a Field Programmable Gate Array (FPGA) unit that provides control signal conversion;

a bit rate generator that produces clock signals needed by the system;

two First In First Out (FIFO) buffers that function as temporary data storage;

an output connector where various Digital TV signal formats are output from; and a control jumper to facilitate configuration of different Digital TV formats and interfaces.

2. The computer add-on card of claim 1, wherein the FIFO buffers consist of a Least Significant Bit (LSB) buffer and a Most Significant Bit (MSB) buffer used as temporary LSB and MSB data storage respectively before they are further sent to interface daughter board for signal format and interface conversion.

3. The computer add-on card of claim 1, wherein the interface daughter board interfaces to the add-on card via a specific interface, and the signals from the add-on card will be converted to another signal format and interface by the signal translator on the interface daughter board and sent back to the add-on card for output.

4. The computer add-on card of claim 3, wherein the interface daughter board supports various Digital TV signal formats and interfaces conversion.

5. The computer add-on card of claim 3, wherein the interface daughter board receives its input signals from the add-on card through a first interface port and the converted signals from the interface daughter board are sent back to the add-on card through a second interface port.

6. The computer add-on card of claim 5, wherein the first interface port position forms an angle of 90 degrees with respect to the second interface port position.

7. The computer add-on card of claim 1, wherein the standard PCI interface is used to connect it to computer.

* * * * *